United States Patent Office 2,714,605
Patented Aug. 2, 1955

2,714,605

SULFATION OF HYDROXYLATED POLYBUTADIENES

Rufus V. Jones, Bartlesville, Okla., assignor to Phillips Petroleum Company, a corporation of Delaware No Drawing. Application May 7, 1951, Serial No. 225,053

24 Claims. (Cl. 260—458)

This invention relates to the production of polybutadiene sulfates and poly-butadiene sulfuric acids. In one of its more specific aspects it relates to a novel process for the production of polybutadiene sulfates. In one specific embodiment this invention relates to the production of polybutadiene sulfates and polybutadiene sulfuric acids from hydroxylated polybutadienes.

An object of this invention is the production of polybutadiene sulfates.

Another object is the production of organic salts of polybutadiene sulfuric acids.

Another object is the production of metallic salts of polybutadiene sulfuric acids.

Still another object is the production of polybutadiene sulfuric acids.

Another object is the production of sulfated-hydroxylated polybutadienes.

A further object is the production of hydroxylated polybutadiene sulfuric acids.

A still further object is to provide a novel process for the production of polybutadiene sulfates and polybutadiene sulfuric acids.

Other objects and advantages of this invention will be apparent to those skilled in the art from the accompanying discussion and disclosure.

In accordance with my invention, a hydroxylated polybutadiene is sulfated utilizing an organic complex of sulfur trioxide. Such complexes are characterized by the following, although I do not intend to limit my invention merely to these examples: pyridine, dioxane, N,N-dimethylaniline, or B,B-dichlorodiethyl ether and mixtures thereof, with sulfur trioxide. Although these are complexes in one sense of the word, they have been recognized by the art as definite compounds, even though their exact molecular structure has not been precisely established. The sulfating reaction is effected in a solvent consisting of a tertiary amine, for example, pyridine, this solvent having the property of forming complexes or compounds with any acidic substance which might form in the reaction zone. Other examples of these solvents belonging to the class of tertiary amines are alkyl pyridines, such as picolines, N,N-dimethylaniline, and quinoline. Mixtures of these tertiary amine solvents can also be used.

The term "polybutadiene" as used herein is defined as a polymer of 1,3-butadiene, or a copolymer of a major portion of 1,3-butadiene with a mono-olefinic hydrocarbon polymerizable therewith, such as styrene, alphamethylstyrene, or the like. The hydroxylated polybutadiene utilized in my invention is obtained by hydroxylating a liquid polybutadiene having a molecular weight in the range of 200 to 5000. It can be produced in any known manner so long as the hydroxypolybutadiene contain from 0.1 to 2 hydroxyl groups, on the average, per butadiene unit in the molecule.

The term "polybutadiene sulfate" as employed herein refers to the organic and metallic salts of hydroxylated polybutadiene sulfuric acids. It is to include those compounds of which only a portion of the hydroxy groups are sulfated as well as those having all of the hydroxy groups sulfated.

According to a preferred method of manufacturing salts of polybutadiene sulfates, a hydroxylated polybutadiene, a sulfating agent, and a tertiary amine solvent, are charged to a suitable reactor, i. e., one equipped with stirring and heating mechanisms, in the proportions of 1 to 5 mols of sulfating agent and 1 to 20 mols of tertiary amine solvent per butadiene unit in the hydroxylated polybutadiene. When using an added diluent, I usually prefer to use not more than 30 mols of the diluent per butadiene unit in the hydroxylated polybutadiene. Suitable diluents are inert organic compounds, such as benzene, cyclohexane, hexane, and mixtures thereof. The advantage in using the diluent is that it enables the reaction mixture to be more easily agitated and provides better contacting of reactants. If no diluent is employed, then at least 10 mols of the tertiary amine solvent per butadiene unit in the hydroxylated polybutadiene are employed. It will be understood that when the same material as is complexed with sulfur trioxide is used as the solvent, it is a separate compound from the complex. The reaction mixture is then heated with agitation for a period ranging from 1 to 25 hours and preferably in the range of 4 to 15 hours. After the reaction has been completed the liquid portion of the reaction mixture comprising excess sulfating agent, solvent, and diluent, if used, is separated from the resultant product, which is an organic salt of the polybutadiene sulfuric acid. This salt is the salt of a tertiary amine, and may be either a liquid or a solid or semi-solid, depending on the size of the hydroxylated polybutadiene molecule, and is soluble in water. This salt is washed with a material such as benzene, or another liquid hydrocarbon inert thereto to remove excess tertiary amine not bound to the salt. Following the first washing step the salt is then washed in a second step with an alcohol such as methanol, ethanol, propanol, or with another suitable oxygenated hydrocarbon to remove excess sulfating agent. The final product of the washing is a purified complex salt of an organic compound and polybutadiene sulfuric acid.

To obtain a metal salt of polybutadiene sulfuric acid 0.5 to 10 mols of an ion-yielding material per butadiene unit in the hydroxylated polybutadiene is added, such as an alkali metal salt or hydroxide or a salt or hydroxide of group IIA metals, for example sodium hydroxide, calcium chloride, potassium carbonate. This metal ion-yielding material can be added with or without water or alcohol, such as methanol, ethanol, propanol, etc. The product is then washed to remove the organic compound displaced from the organic salt of polybutadiene sulfuric acid and the metal compound residue. Suitable washing agents for this step are those used to wash the organic compound salt of the polybutadiene sulfuric acid. To obtain the polybutadiene sulfuric acid, a mineral acid, such as hydrochloric acid or sulfuric acid, can be added to the first produced organic salt of the polybutadiene. The resulting polybutadiene sulfuric acid is then separated, as by filtering or decanting or other suitable means, depending on whether it is a liquid or a solid, and is washed in a manner similar to that used in washing the organic salt of polybutadiene sulfuric acid. To accomplish this acidulation the mineral acid can be added in concentrated form or as a dilute aqueous solution while the complex is in an aqueous, alcoholic, or aqueous alcohol solution, or a gas such as HCl can be bubbled through an aqueous solution of the salt. The polybutadiene sulfuric acid is generally soluble in water and can be recovered from an aqueous solution by precipitating with an alcohol.

While the mechanism of the reactions involved has not been precisely established, to the best of my knowledge it may be represented by the following equations. In these equations A represents a molecule of hydroxylated polybutadiene, less one OH group which is represented as such, and X is pyridine used as the material with which the $SO_3$ is complexed and as the solvent. The use of pyridine is exemplary, but I am not limited thereto. The first reaction, that of producing an organic salt of polybutadiene sulfuric acid, is represented by Equation 1

(1) $\quad AOH + SO_3 \cdot X \rightarrow AOSO_3H \cdot X$

The second reaction which provides a metallic salt of polybutadiene sulfuric acid comprises treatment of the product of Equation 1 with ion-yielding metal salt or hydroxide according to Equations 2 and 3.

(2) $\quad AOSO_3H \cdot X + NaCl \rightarrow AOSO_3Na + X \cdot HCl$ (3) $\quad AOSO_3H \cdot X + KOH \rightarrow AOSO_3K + X + H_2O$ To produce a polybutadiene sulfuric acid, the product of Equation 1 is treated with a mineral acid, as disclosed, the reaction being shown by Equation 4.

(4) $\quad AOSO_3H \cdot X + HCl \rightarrow AOSO_3H + X \cdot HCl$

In a second embodiment of my invention, which is also quite suitable for adaptation to commercial use, as is the first embodiment, the hydroxylated polybutadiene, the sulfating agent, the tertiary amine solvent, and the diluent, if any, are charged to a reactor in the aforementioned proportions and heated with agitation for a period in the range of 1 to 25 hours and preferably 4 to 15 hours. After the reaction is completed the ion-yielding material is added with stirring in the proportions previously specified. Along with this material, a solvent therefor, such as water and/or alcohol, can be added if desired. The product metal salt is then separated from the liquid phase and washed in a manner previously described. The difference between this mode of operation and the preferred mode first discussed is the elimination of the washing step with benzene or similar washing agent, and the washing step with an alcohol prior to addition of the ion-yielding material.

In still a third embodiment of my invention, the hydroxylated polybutadiene, the sulfating agent, the tertiary amine, the diluent, if any, and the ion-yielding material are all added to the reactor initially, and are heated with stirring for a period within the above mentioned ranges. The resulting polybutadiene sulfate comprising a metal salt of polybutadiene sulfuric acid is separated and washed as before. This method is likewise very easily adapted to commercial operation, and although it may not give quite as pure a product, it may be desirable to sacrifice a certain amount of purity in favor of simplicity and economy of operation.

In all the above discussed embodiments of my invention, the ratio of sulfating agent used within the range specified, and the reaction temperature, depend largely upon the degree of substitution desired in the product, and may be varied accordingly. Thus, temperatures may be varied from 40 to 115° C., however, in most cases it is preferred to maintain them within the range of 70 to 100° C. It is also generally desired that the ion-yielding material be supplied in the lower range of the amounts specified, as it is desired to utilize an amount of this material only slightly in excess of the theoretical amount required. This is so that the material is substantially completely utilized in the reaction, and little or none of it is left in the reaction products.

The polybutadiene sulfuric acids and polybutadiene sulfates of my invention have many uses, among which are included use in textile sizings, adhesives, water emulsion paints, drilling muds, water emulsion insecticide sprays, and detergent compositions.

One desirable method of obtaining hydroxylated polybutadiene to be sulfated in accordance with the present invention is described in the copending application of J. C. Hillyer and L. O. Edmonds, Serial No. 204,062, filed January 2, 1951, entitled "Hydroxypolybutadiene and Esters Thereof," and issued on October 26, 1954, as U. S. Patent 2,692,892, the disclosure of which is hereby incorporated herein by reference. In accordance with that method, a liquid polybutadiene, preferably having an average molecular weight in the range of 200 to 5000 and a viscosity of 100 to 6000 Saybolt Furol seconds at 100° F. (preferably prepared by sodium catalyzed bulk polymerization of 1,3-butadiene as described in the application of W. W. Crouch, Serial No. 67,098, filed December 23, 1948, and issued on March 10, 1953, as U. S. Patent 2,631,175) is hydroxylated with hydrogen peroxide or a hydrogen peroxide-yielding substance in aqueous solution in the presence of a catalyst comprising formic acid or a lower alkyl (methyl, ethyl, or propyl) ester of formic acid. The hydroxypolybutadiene product ranges from a glassy solid to a viscous liquid. If desired it can be partially hydrogenated prior to being hydroxylated, or the hydroxylated product can be hydrogenated prior to the sulfation of the present invention.

*Example*

To 17.5 grams of hydroxylated polybutadiene, containing about 11.5 weight per cent hydroxyl groups, dissolved in 150 cc. of benzene were added 75 grams of pyridine-sulfur trioxide complex and 150 cc. of pyridine. This mixture was heated and stirred. At 70° C. the solid portion begins to ball and form a plastic mass. Heating was continued to 90° C. and maintained for 8 hours. The product was dark and plastic-like when cool. The benzene-pyridine phase was clear and was poured from the plastic mass. Methanol was added and the mixture warmed with stirring until the plastic mass became fluid. Solid sodium hydroxide was added until the alcoholic solution was basic and a dark red color. After cooling and filtering a reddish solid was obtained. This was washed slightly with alcohol and dried in vacuum at 110° F. for 15 hours. The yield was 32.5 grams. The product did not melt below 260° C. It dispersed in water to form a viscous dispersion. A sample was thoroughly extracted with methanol to remove all alkali, then analyzed for total sulfur and soluble sulfur. The product was found to contain 0.16 sulfate groups for each butadiene unit in the product. The product contained 29.5 weight per cent sodium sulfate.

Considerable variation in properties of reactants and reaction conditions are permissible without departing from the scope of this invention as defined in the accompanying claims.

I claim:

1. A process which comprises reacting a hydroxylated polybutadiene with a complex of sulfur trioxide and an organic compound in the presence of a tertiary amine solvent and thereby sulfating at least a portion of the hydroxyl groups of said hydroxylated polybutadiene.

2. A method for the sulfation of a hydroxy polybutadiene which comprises reacting a hydroxylated polybutadiene with a complex of sulfur trioxide and an organic compound at a temperature in the range of 40 to 115° C., for a period of time in the range of 2 to 25 hours, and in the presence of a tertiary amine solvent, and thereby sulfating at least a portion of the hydroxyl groups of said hydroxylated polybutadiene.

3. A method for the production of a polybutadiene sulfate which comprises reacting a hydroxylated polybutadiene with a complex of sulfur trioxide and an organic compound at a temperature in the range of 40 to 115° C., a reaction time of 2 to 25 hours, in the presence of a tertiary amine solvent, and in a ratio of sulfating agent to hydroxy polybutadiene in the range of 1 to 5 mols per butadiene unit in the hydroxylated polybutadiene, and thereby sulfating at least a portion of the hydroxyl groups of said hydroxylated polybutadiene.

4. A method for the production of a polybutadiene sulfate which comprises reacting a hydroxylated polybutadiene with a complex of sulfur trioxide and an organic compound at a temperature in the range of 40 to 115° C., a reaction time of 2 to 25 hours, in the presence of 1 to 20 mols of tertiary amine solvent per butadiene unit in the hydroxylated polybutadiene, in the presence of not more than 30 mols per butadiene unit in the hydroxylated polybutadiene of a diluent selected from the group consisting of benzene, cyclohexane, hexane, and mixtures thereof, and in a ratio of sulfating agent to polybutadiene in the range of 1 to 5 mols per butadiene unit in the hydroxylated polybutadiene, and thereby sulfating at least a portion of the hydroxyl groups of said hydroxylated polybutadiene.

5. A method for the production of a polybutadiene sulfate which comprises reacting a hydroxylated polybutadiene the polybutadiene residue of which has a molecular weight in the range of 200 to 5000 which a complex of sulfur trioxide and an organic compound selected from the group consisting of pyridine, dioxane, N,N-dimethylaniline, B,B-dichlorodiethylether, and mixtures thereof, at a temperature in the range of 40 to 115° C., a reaction time within the range of 2 to 25 hours, and in the presence of a solvent capable to forming complexes with any acidic substance formed by the reaction comprising tertiary amines selected from the group consisting of pyridine, picolines, N,N-dimethylaniline, quinoline, and mixtures thereof, thereby sulfating at least a portion of the hydroxyl groups of said hydroxylated polybutadiene, separating the liquid portion of the reaction mixture from the resultant product and washing said product to remove excess solvent and sulfating agent, and recovering a polybutadiene sulfate.

6. A method for the production of metal salts of polybutadiene sulfuric acids which comprises reacting a hydroxylated polybutadiene with a complex of sulfur trioxide and an organic compound at a temperature in the range of 40 to 115° C., for a reaction time in the range of 2 to 25 hours, and in the presence of a tertiary amine solvent, contacting the resultant organic salt of a polybutadiene sulfuric acid with 0.5 to 10 mols of an ion-yielding material per butadiene unit in the hydroxylated polybutadiene, said ion-yielding material being utilized in an alcoholic solution, and contacting the resultant polybutadiene sulfate with an ion-yielding material comprising a compound of a metal selected from the group consisting of alkali metals and group IIA metals.

7. A method for the production of metal salts of polybutadiene sulfuric acids which comprises reacting a hydroxylated polybutadiene the polybutadiene residue of which has a molecular weight in the range of 200 to 5000 and containing 0.1 to 2 hydroxyl groups per butadiene unit in the hydroxylated polybutadiene, with a sulfating agent comprising a complex of sulfur trioxide and an organic compound at a temperature in the range of 70 to 100° C., for a reaction time in the range of 1 to 25 hours and in the presence of a tertiary amine solvent, using 1 to 5 mols of said sulfating agent and 1 to 20 mols of tertiary amine solvent per butadiene unit in the hydroxylated polybutadiene, contacting the organic salt of polybutadiene sulfuric acid produced with an ion-yielding material comprising a compound of a metal selected from the group consisting of alkali metals and group IIA metals, and separating and recovering the product metal salt of a polybutadiene sulfuric acid.

8. A method for the production of metal salts of polybutadiene sulfuric acids which comprises reacting a hydroxylated polybutadiene the polybutadiene residue of which has a molecular weight in the range of 200 to 5000 and containing 0.1 to 2 hydroxyl groups per butadiene unit in the hydroxylated polybutadiene with a sulfating agent comprising a complex of sulfur trioxide and an organic compound at a temperature in the range of 70 to 100° C., for a reaction time in the range of 1 to 25 hours, and in the presence of a tertiary amine solvent and an inert organic liquid diluent, using 1 to 5 mols of said sulfating agent, 1 to 20 mols of said tertiary amine solvent, and not more than 30 mols of said liquid diluent per butadiene unit in the hydroxylated polybutadiene, and contacting the polybutadiene sulfate produced with a solution of an ion-yielding material comprising a compound selected from the group consisting of alkali metals and group IIA metals.

9. A method for the production of metal salts of polybutadiene sulfates which comprises reacting a hydroxylated polybutadiene the polybutadiene residue of which has a molecular weight in the range of 200 to 5000 and containing 0.1 to 2 hydroxyl groups per butadiene unit in the hydroxylated polybutadiene with a sulfating agent comprising a complex of sulfur trioxide and an organic compound at a temperature in the range of 70 to 100° C., for a reaction time in the range of 4 to 15 hours, and in the presence of a tertiary amine solvent and an inert organic liquid diluent, using 1 to 5 mols of said sulfating agent, 1 to 20 mols of said tertiary amine solvent, and not more than 30 mols of said liquid diluent per butadiene unit in the hydroxylated polybutadiene, separating the resultant product which is an organic compound salt of polybutadiene sulfuric acid and washing same to remove excess solvent and diluent and sulfating agent, contacting the washed product with an ion-yielding material comprising a compound selected from the group consisting of alkali metals and group IIA metals, thereby displacing the organic compound from said polybutadiene sulfate with a metal from said group, and washing the metal salt of polybutadiene sulfuric acid, and recovering the purified product.

10. A method for the production of metal salts of polybutadiene sulfuric acids which comprises reacting a hydroxylated polybutadiene with a complex of sulfur trioxide and an organic compound at a temperature in the range of 40 to 115° C., for a reaction time in the range of 2 to 25 hours, and in the presence of a tertiary amine solvent, contacting the resultant organic salt of polybutadiene sulfuric acid with an ion-yielding material comprising a compound of a metal selected from the group consisting of alkali metals and group IIA metals.

11. A method for the production of polybutadiene sulfuric acid which comprises reacting a hydroxylated polybutadiene with a complex of sulfur trioxide and an organic compound at a temperature in the range of 40 to 115° C., a reaction time in the range of 1 to 25 hours, and in the presence of a tertiary amine solvent, separating an organic salt of a polybutadiene sulfuric acid from the reaction effluent, and treating same with a mineral acid.

12. A method for the production of polybutadiene sulfuric acids which comprises reacting a hydroxylated polybutadiene with a complex of sulfur trioxide and an organic compound at a temperature in the range of 40 to 115° C., a reaction time in the range of 1 to 25 hours, and in the presence of a tertiary amine solvent capable of forming a complex with any acidic substance formed by the reaction, and in the presence of an inert organic liquid diluent, separating an organic salt of a polybutadiene sulfuric acid from the reaction effluent, and treating same with a mineral acid.

13. A method for the production of polybutadiene sulfuric acids which comprises reacting a hydroxylated polybutadiene the polybutadiene residue of which has a molecular weight in the range of 200 to 5000 and containing 0.1 to 2 hydroxyl groups per butadiene unit in the hydroxylated polybutadiene with a sulfating agent comprising a complex of sulfur trioxide and an organic compound at a temperature in the range of 70 to 100° C., for a reaction time in the range of 1 to 25 hours, and in the presence of a tertiary amine solvent, using 1 to 5 mols of said sulfating agent and 1 to 20 mols of tertiary amine solvent per butadiene unit in the hydroxylated polybutadiene, contacting the polybutadiene sulfate produced with a mineral acid, and separating and recovering the product polybutadiene sulfuric acid.

14. A method according to claim 13 wherein an inert organic liquid diluent is used along with said tertiary amine solvent in an amount not to exceed 30 mols per butadiene unit in the hydroxylated polybutadiene.

15. A method for the production of polybutadiene sulfuric acids which comprises reacting a hydroxylated polybutadiene the polybutadiene residue of which has a molecular weight in the range of 200 to 5000 and containing 0.1 to 2 hydroxyl groups per butadiene unit in the hydroxylated polybutadiene with a sulfating agent comprising a complex of sulfur trioxide and an organic compound at a temperature in the range of 70 to 100° C., for a reaction time in the range of 4 to 15 hours, and in the presence of a tertiary amine solvent and an inert organic liquid diluent, using 1 to 5 mols of said sulfating agent, 1 to 20 mols of said tertiary amine solvent, and not more than 30 mols of said liquid diluent per butadiene unit in the hydroxylated polybutadiene, separating the resultant product which is an organic compound salt of polybutadiene sulfate, and washing same to remove excess solvent and diluent and sulfating agent, contacting the washed product with a mineral acid, thereby displacing the organic compound from said polybutadiene sulfate, and washing the polybutadiene sulfuric acid, and recovering the purified product.

16. A composition of matter which comprises a sulfated hydroxylated polybutadiene having at least a portion of the hydroxy groups of said hydroxylated polybutadiene sulfated by reacting the hydroxylated polybutadiene with a complex of sulfur trioxide and an organic compound in the presence of a tertiary amine solvent.

17. A composition of matter which comprises a sulfated hydroxylated polybutadiene having at least a portion of the hydroxy groups of said hydroxylated polybutadiene sulfated by reacting the hydroxylated polybutadiene with a complex of sulfur trioxide and an organic compound at a temperature in the range of 40 to 115° C., a reaction time of 2 to 25 hours, in the presence of 1 to 20 mols of tertiary amine solvent per butadiene unit in the hydroxylated polybutadiene, in the presence of not more than 30 mols per butadiene unit in the hydroxylated polybutadiene of a diluent selected from the group consisting of benzene, cyclohexane, hexane and mixtures thereof, and in a ratio of sulfating agent to hydroxylated polybutadiene in the range of 1 to 5 mols per butadiene unit in the hydroxylated polybutadiene.

18. A composition of matter which comprises a sulfated hydroxylated polybutadiene having at least a portion of the hydroxy groups of the hydroxylated polybutadiene sulfated by reacting said hydroxylated polybutadiene, the polybutadiene residue of which has a molecular weight in the range of 200 to 5000, with a complex of sulfur trioxide and an organic compound selected from the group consisting of pyridine, dioxane, N,N-dimethylaniline, B,B-dichlorodiethylether, and mixtures thereof, at a temperature in the range of 40 to 115° C., a reaction time within the range of 2 to 25 hours, and in the presence of a solvent capable of forming complexes with any acidic substance formed by the reaction comprising tertiary amines selected from the group consisting of pyridine, picolines, N,N-dimethylaniline, quinoline, and mixtures thereof, separating the liquid portion of the reaction mixture from the resultant product and washing said product to remove excess solvent and sulfating agent.

19. A composition of matter which comprises a metal salt of hydroxylated polybutadiene sulfuric acid produced by reacting a hydroxylated polybutadiene with a complex of sulfuric trioxide and an organic compound at a temperature in the range of 40 to 115° C., for a reaction time in the range of 2 to 25 hours, and in the presence of a tertiary amine solvent, and contacting the resultant organic salt of polybutadiene sulfuric acid with an ion-yielding material comprising a compound of a metal selected from the group consisting of alkali metals and group IIA metals.

20. A composition of matter which comprises a metal salt of hydroxylated polybutadiene sulfuric acid produced by reacting a hydroxylated polybutadiene with a complex of sulfuric trioxide and an organic compound at a temperature in the range of 40 to 115° C., for a reaction time in the range of 2 to 25 hours, and in the presence of a tertiary amine solvent, contacting the resultant organic salt of a polybutadiene sulfuric acid with 0.5 to 10 mols of an ion-yielding material per butadiene unit in the hydroxylated polybutadiene, said ion-yielding material being utilized in an alcoholic solution, and contacting the resultant polybutadiene sulfate with an ion-yielding material comprising a compound of a metal selected from the group consisting of alkali metals and group IIA metals.

21. A composition of matter which comprises a metal salt of hydroxylated polybutadiene sulfate produced by reacting a hydroxylated polybutadiene, the polybutadiene residue of which has a molecular weight in the range of 200 to 5000, and containing 0.1 to 2 hydroxyl groups per butadiene unit in the hydroxylated polybutadiene, with a sulfating agent comprising a complex of sulfur trioxide and an organic compound at a temperature in the range of 70 to 100° C., for a reaction time in the range of 4 to 15 hours, and in the presence of a tertiary amine solvent and an inert organic liquid diluent, using 1 to 5 mols of said sulfating agent, 1 to 20 mols of said tertiary amine solvent, and not more than 30 mols of said liquid diluent per butadiene unit in the hydroxylated polybutadiene, separating the resultant product which is an organic compound salt of polybutadiene sulfuric acid and washing same to remove excess solvent and diluent and sulfating agent, contacting the washed product with an ion-yielding material comprising a compound selected from the group of alkali metals and group IIA metals, thereby displacing the organic compound from said polybutadiene sulfate with a metal from said group, and washing the metal salt of polybutadiene sulfuric acid, and recovering the purified product.

22. A composition of matter which comprises a hydroxylated polybutadiene sulfuric acid produced by reacting a hydroxylated polybutadiene with a complex of sulfur trioxide and an organic compound at a temperature in the range of 40 to 115° C., a reaction time in the range of 1 to 25 hours, and in the presence of a tertiary amine solvent, separating an organic salt of a polybutadiene sulfuric acid from the reaction effluent, and treating same with a mineral acid.

23. A composition of matter which comprises a hydroxylated polybutadiene sulfuric acid produced by reacting a hydroxylated polybutadiene, the polybutadiene residue of which has a molecular weight in the range of 200 to 5000, and containing 0.1 to 2 hydroxyl groups per butadiene unit in the hydroxylated polybutadiene, with a sulfating agent comprising a complex of sulfur trioxide and an organic compound at a temperature in the range of 70 to 100° C., for a reaction time in the range of 1 to 25 hours and in the presence of a tertiary amine solvent and an inert organic liquid diluent, using 1 to 5 mols of said sulfating agent, 1 to 20 mols of said tertiary amine solvent, and not more than 30 mols of said inert organic liquid diluent per butadiene unit in the hydroxylated polybutadiene, contacting the polybutadiene sulfate produced with a mineral acid and separating and recovering the product hydroxylated polybutadiene sulfuric acid.

24. A composition of matter which comprises a hydroxylated polybutadiene sulfuric acid produced by reacting a hydroxylated polybutadiene, the polybutadiene residue of which has a molecular weight in the range of 200 to 5000, and containing 0.1 to 2 hydroxyl groups per butadiene unit in the hydroxylated polybutadiene, with a sulfating agent comprising a complex of sulfur trioxide and an organic compound, at a temperature in the range of 70 to 100° C., for a reaction time in the range of 4 to 15 hours, and in the presence of a tertiary amine solvent and an inert organic liquid diluent, using 1 to 5 mols of said sulfating agent, 1 to 20 mols of said tertiary amine solvent, and not more than 30 mols of said liquid diluent per butadiene unit in the hydroxylated polybutadiene, separating the resultant product which is an organic compound salt of polybutadiene sulfate, and washing same to remove excess solvent and diluent and sulfating agent, contacting the washed product with a mineral acid, thereby displacing the organic compound from said polybutadiene sulfate, and washing the polybutadiene sulfuric acid.

References Cited in the file of this patent

UNITED STATES PATENTS

| | | |
|---|---|---|
| 2,268,443 | Crowder | Dec. 30, 1941 |
| 2,403,226 | Lecher | July 2, 1946 |
| 2,507,944 | Taras | May 16, 1950 |
| 2,606,202 | Lecher et al. | Aug. 5, 1952 |